United States Patent
Carter et al.

(10) Patent No.: US 7,381,668 B2
(45) Date of Patent: Jun. 3, 2008

(54) SELF-EXTINGUISHING DIFFERENTIALLY ENTANGLED NONWOVEN FABRICS

(75) Inventors: Nick Carter, Hutchinson, KS (US); Jennifer Mayhorn, Huntersville, NC (US)

(73) Assignee: Polymer Group, Inc., Charlotte, NC (US)

( * ) Notice: Subject to any disclaimer, the term of this patent is extended or adjusted under 35 U.S.C. 154(b) by 0 days.

(21) Appl. No.: 11/121,656

(22) Filed: May 4, 2005

(65) Prior Publication Data

US 2005/0255780 A1 Nov. 17, 2005

Related U.S. Application Data

(60) Provisional application No. 60/567,897, filed on May 4, 2004.

(51) Int. Cl.
*D04H 1/46* (2006.01)
*D04H 3/10* (2006.01)
*D04H 5/02* (2006.01)
*B32B 5/06* (2006.01)
*B32B 5/26* (2006.01)
*B32B 7/08* (2006.01)

(52) U.S. Cl. ............. 442/408; 442/402; 442/381; 442/387; 442/392; 428/156; 428/170; 428/920

(58) Field of Classification Search ......... 442/414, 442/402, 408, 415, 381, 389, 387, 392; 428/920, 428/156, 170; 28/103, 104, 107
See application file for complete search history.

(56) References Cited

U.S. PATENT DOCUMENTS 3,485,706 A * 12/1969 Evans ................. 428/134
4,041,203 A 8/1977 Brock et al.
4,750,443 A * 6/1988 Blaustein et al. ......... 112/420
4,847,140 A * 7/1989 Jaskowski ............... 428/220
5,098,764 A 3/1992 Drelich et al.
5,475,903 A 12/1995 Collins
5,560,990 A 10/1996 Ilg et al.
5,678,379 A 10/1997 Quattrociocchi
5,679,379 A 10/1997 Fabbricante et al.
5,766,745 A * 6/1998 Smith et al. ............. 428/218
6,108,879 A * 8/2000 Forte et al. ................ 28/104
6,114,017 A 9/2000 Fabbricante et al.
2002/0146957 A1* 10/2002 Fuller et al. ............. 442/409
2004/0248494 A1* 12/2004 Hartgrove et al. ........ 442/408
2005/0170732 A1* 8/2005 Knoff ..................... 442/381

FOREIGN PATENT DOCUMENTS

FR  2846201 A1 *  4/2004

OTHER PUBLICATIONS

International Search Report and Written Opinion of International Searching Authority, International Application No. PCT/US05/15388, filed May 4, 2005, 10 pages.

* cited by examiner

*Primary Examiner*—N. L. Torres-Velazquez
(74) *Attorney, Agent, or Firm*—Kilyk & Bowersox, P.L.L.C.; Valerie Calloway

(57) ABSTRACT

The present invention is directed to a hydroentangled nonwoven fabric with improved flame retardant properties and the making thereof, whereby the nonwoven fabric is differentially entangled to collapse upon itself and self-extinguish upon burning. The self-extinguishing fabric further exhibits favorable tactile and ductile softness while obtaining sufficient physical strength.

13 Claims, 3 Drawing Sheets

SELF-EXTINGUISHING DIFFERENTIALLY ENTANGLED NONWOVEN FABRICS

CROSS-REFERENCE TO RELATED APPLICATION

This application claims the priority of Provisional Application No. 60/567,897, which was filed on May 4, 2004, and the disclosure of which is incorporated herein by reference.

TECHNICAL FIELD

The present invention generally relates to a hydroentangled nonwoven fabric with improved flame retardant properties and the making thereof, and more specifically relates to a nonwoven fabric that is differentially entangled to collapse upon itself and self-extinguish, the resulting fabric exhibiting favorable tactile and ductile softness while obtaining sufficient physical strength.

BACKGROUND OF THE INVENTION

Technological advances have proven to provide mattresses, as well as bedding constituents, with significantly better flammability protection. It's been observed, however that specific areas of the mattress are more difficult to protect from an open flame, such as the bottom of the mattress that comes in contact with the underlying box-spring. Further, the holes imparting by the stitching utilized throughout the mattress acts as a pathway for the flame to travel. This invention relates to a durable self-extinguishing nonwoven fabric that can be used for flame-retardant mattress components and other related applications.

There are numerous flame-retardant fibers commercially available. E.I du Pont de Nemours and Company provides flame-retardant aramid fibers sold under the trade names of NOMEX® and KEVLAR®. NOMEX® materials were developed for applications requiring dimensional stability and excellent heat resistance, and which do not flow or melt upon heating. Decomposition and charring does not proceed at a significant rate until well over 350° C. without melting. NOMEX® materials in fibrous form have been used in protective apparel and similar applications, and can be processed by conventional textile technology. Heretofore, comparable flame-retardant nonwoven fabrics have been expensive to manufacture, and have not been susceptible of imaging by high pressure water jet entangling.

Given the prior art attempt to form a soft and yet strong material with thermal protective properties, there remains a need for a nonwoven fabric exhibiting these characteristics and yet is formed in an expeditious and uncomplicated manner.

SUMMARY OF THE INVENTION

The present invention is directed to a hydroentangled nonwoven fabric with improved flame retardant properties and the making thereof, whereby the nonwoven fabric is differentially entangled to collapse upon itself and self-extinguish upon burning. The self-extinguishing fabric further exhibits favorable tactile and ductile softness while obtaining sufficient physical strength.

In a first embodiment of the present invention, the differentially entangled flame retardant nonwoven fabric is comprised of at least three fibrous layers creating a fabric with at least three fibrous zones, wherein first and second zones comprise first and second fibrous outer layers and an intermediate zone comprises at least one centrally located fibrous layer positioned between the first and second outer layers. According to the present invention, the nonwoven fabric layers comprise char forming fibers that are differentially entangled, whereby fluidic energy, preferably hydraulic energy, is applied to one or both faces of the fibrous outer layers. The hydraulic energy is moderated against the basis weight of the fibrous batts to achieve the degree of surface entanglement desired.

The differential entangling technique subsequently results in a fabric with first and second highly entangled fibrous outer zones and a lightly entangled fibrous intermediate zone, wherein each zone is comprised of char forming fiber. The lightly entangled intermediate zone forms an air pocket that provides the fabric with a resistance to heat flow. In addition, the layered, multi-zonal fabric collapses upon itself to self-extinguish once the inner fibers are charred by exposure to an open flame.

In a second embodiment of the present invention, the first and second outer zones are each comprised of more than one fabric layer, wherein each layer is a homogeneous or heterogeneous blend of fibers, including flame retardant and char forming fiber. As previously mentioned, the multi-zonal fabric comprised of the various fibrous layers is differentially entangled to create highly entangled fibrous outer zones and a lightly entangled fibrous intermediate zone.

Not intending to be bound by theory, it is thought that the collapsible self extinguishing fabric occludes those passage ways often found in a layered fibrous constructs. For instance, mechanical bonding of multiple layers by sewing creates open passage ways by which an open flame can travel. The fabric of the present invention collapses to occlude those passage ways and self extinguish the burning fabric.

While use of melamine fibers (BASF Corporation under the trade name of BASOFIL) with varying ratios of aramid fibers, as is disclosed in U.S. Pat. No. 5,560,990, hereby incorporated by reference, are common, the fibrous matrices may comprise synthetic fibers or blends of natural and synthetic fibers. Use of synthetic fibers, including, but not limited to thermoplastic aramids, such as alpha and para-aramids, polyimides, and melamines, either homogenous or heterogenous and blended and/or layered in nature are contemplated within the scope of the present invention, as well as the inclusion of fibers having beneficial flame exposure attributes such as char forming fibers. Further, the synthetic fibers may comprise homogeneous, bi-component, and/or multi-component profiles and the blends thereof.

In one embodiment, the fibrous batts are carded and cross-lapped and further juxtaposed to form a layered construct. The fibrous batts are then continuously indexed through a station composed of a rotary foraminous surface and a fluidic manifold. Fluid streams from the fluidic manifold impinge upon the fibrous batts at a controlled energy level so as to integrate a portion of the overall fibrous content. The energy level is controlled such that the energy is sufficient to induce high levels of entanglement in the surface fibers, but has insufficient transmitted energy to induce high levels of entanglement of the inner fibers. A plurality of such stations can be employed whereby fluid streams are at the same or differing energy levels, impinging one or alternately both surfaces of the fibrous batts. The resulting differentially entangled nonwoven fabric exhibits highly entangled fibrous outer surfaces and a lightly entangled fibrous core, whereby the lightly entangled fibrous core provides a sufficient pocket of air between the highly entangled fibrous outer surfaces that serves as an insulator, contributing to the self-extinguishing properties of the fabric. Furthermore, the differentially entangled flame retardant nonwoven fabric exhibits a desired softness and strength suitable for various end use applications.

Subsequent to hydroentanglement, the present method further contemplates the provision of a three dimensional image transfer device having a movable imaging surface. Such three-dimensional image transfer devices are disclosed in U.S. Pat. No. 5,098,764, the disclosure of which is hereby incorporated by reference. In a typical configuration, the image transfer device may comprise a drum-like apparatus that is rotatable with respect to one or more hydroentangling manifolds.

It is within the purview of this invention that tension control means can be employed to further enhance the physical performance of the resulting thermal protective material.

It is further within the purview of the present invention that physical property altering chemistries can be incorporated into the resulting differentially entangled thermal protective fabric. Such chemistries include for example antistatic agents which can be durably applied to the constituent fibers of the fibrous batt, to the fibrous batt during manufacture, and/or to the resulting fabric.

Other features and advantages of the present invention will become readily apparent from the following detailed description, the accompanying drawings, and the appended claims.

DETAILED DESCRIPTION

Figure 1:
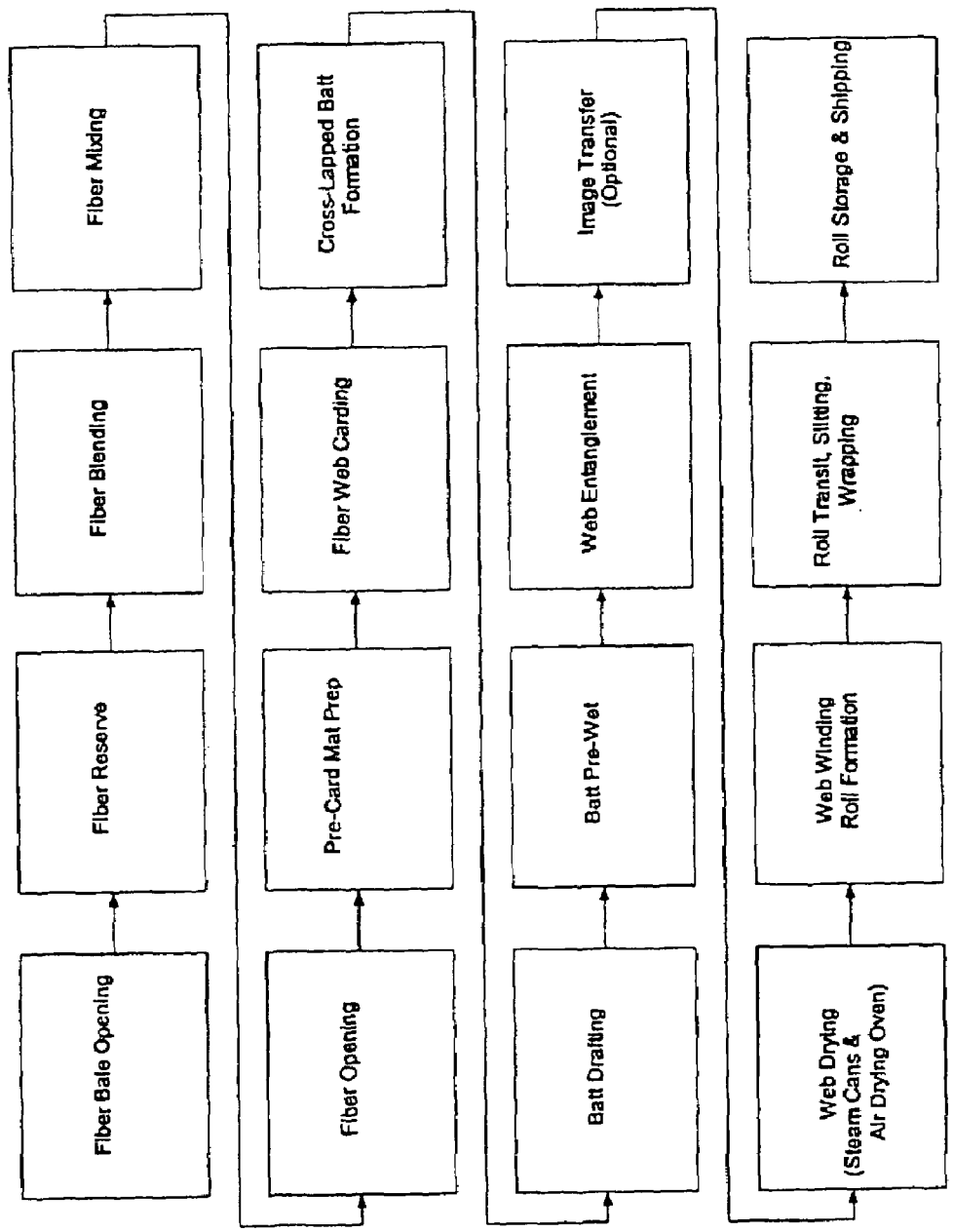
FIG. 1 is a diagrammatic view of an apparatus for manufacturing a differentially entangled nonwoven fabric, embodying the principles of the present invention.

While the present invention is susceptible of embodiment in various forms, there is shown in the drawings and will hereinafter be described a presently preferred embodiment of the invention, with the understanding that the present disclosure is to be considered as an exemplification of the invention, and is not intended to limit the invention to the specific embodiment illustrated.

The present invention is directed to a method of forming flame retardant nonwoven fabrics that exhibit controlled collapsibility to self-extinguish. The multi-zoned fabric is formed by hydroentanglement, wherein the outer surface layers of the fabric is substantially more entangled than the inner layer. Hydroentanglement by this method is controlled by the application of fluidic energy such that the energy imparted into fibers of the fabric is sufficient to highly entangle only the outer fibrous zones. The intermediate fibrous zone is lightly entangled such that the overall structure is resistant to separation of the layers, imparting tactile and ductile softness, in addition to an insulative air pocket that is responsible for resisting heat flow.

According to the invention, in a first embodiment, each fibrous zone within the nonwoven fabric is comprised of char forming fiber. In such an embodiment, each zone is comprised of at least one fibrous layer, whereby the entire construct is differentially entangled. As the fibers within the outer fibrous zones and the intermediate zone burns, the fabric collapses upon itself to self-extinguish. The fabric is formed from at least three layers of fibrous batts. The first and second outer layers typically comprise char forming fibers, however a blend of flame retardant synthetic fibers, including, but not limited to thermoplastic aramids, such as alpha and para-aramids, melamines, polyimides, polyacrylonitriles, modacrylics, intumescent fibers, and the combinations thereof may also be utilized.

Further, in a second embodiment, each fibrous zone, that is to say the first and second outer fibrous zones and the intermediate fibrous zone comprise more than one fibrous layer, wherein each fibrous layer may comprise a heterogeneous or homogeneous fiber composition. In attempt to further control the collapsibility, one or more fibrous layers of one or more zones may comprise fibers that exhibit a wide range of deniers from macro- to micro-deniers, as well as fibers of varying cross-sections, including, but not limited to penta-lobal, tri-lobal, oval, and hollow fibers.

In accordance with the present invention the fibrous batts are advanced with relatively low tension through one or more entanglement stations, whereby differential fiber entanglement is achieved, with the physical properties, both aesthetic and mechanical, of the resultant fabric being desirably attained. The level of entanglement of the self-extinguishing nonwoven fabrics for this application may be controlled such that the level of entanglement of the first and second fibrous outer surfaces is reduced so that the fibrous intermediate zone can retain further loft. In the alternative, the surface entanglement can be increased while retaining a somewhat reduced loftiness. It is within the scope of the present invention to control the level of entanglement in the resulting fabric to obtain materials with varying degrees of loft. A material of this nature is found to have various end uses including, but not limited to mattress covers and components, pillow covers, and thermal protective garments, such as inner linings.

Nonwoven fabrics are frequently produced using staple length fiber; the fabric typically has a degree of exposed surface fibers that will lint if not sufficiently retained into the structure of the fabric. The present invention provides a finished fabric that can be cut, processed or treated, and packaged for retail sale. The cost associated with forming and finishing steps can be desirably reduced.

Figure 2:
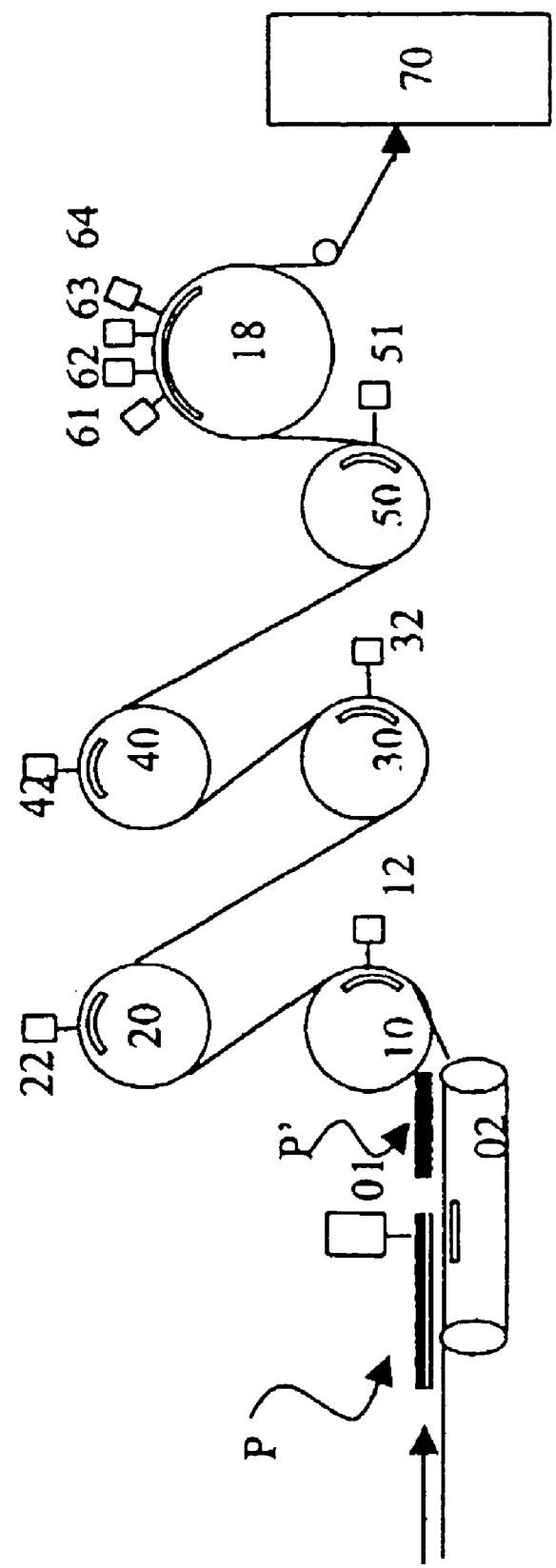
FIG. 2 is a diagrammatic view of five consecutive entangling sections and an image transfer station.

With reference to FIG. 2, therein is illustrated an apparatus for practicing the present method for forming a durable yet soft, collapsible, self-extinguishing nonwoven fabric. The fibrous batts are carded, optionally cross-lapped, and juxtaposed in a face-to-face relationship to form a layered construct, designated P. The layered construct is described as having first and second outer fibrous zones and an intermediate zone. In one embodiment, the fibrous batts comprises 100% cross-lap fibers, that is, all of the fibers of the layered construct have been formed by cross-lapping a carded web so that the fibers are oriented at an angle relative to the machine direction of the resultant construct. In this embodiment, the fibrous batt has a draft ratio of approximately 2.5 to 1. U.S. Pat. No. 5,475,903, the disclosure of which is hereby incorporated by reference, illustrates a web drafting apparatus.

FIG. 2 illustrates a hydroentangling apparatus for forming collapsible self-extinguishing nonwoven fabrics in accordance with the present invention. The apparatus includes a foraminous forming surface in the form of belt 02 upon which the layered construct P is positioned for pre-entangling by entangling manifold 01 into a wetted, lightly entangled fibrous construct P'. Pre-entangling of the fibrous construct is subsequently effected by movement of the construct P' sequentially over a drum 10 having a foraminous forming surface, with entangling manifold 12 effecting entanglement of the layered construct. Further entanglement of the construct may be effected on the foraminous forming surface of a drum 20 by entanglement manifold 22, with the construct subsequently passed over successive foraminous drums 30, 40 and 50, for successive entangling treatment by entangling manifolds 32, 42 and 51. The total, optimal energy input to the fibrous batts to give the desired level of surface entanglement is in the range of about 0.027 to 0.046 hp-hr/lb.

The entangling apparatus of FIG. 2 may further include an imaging and patterning drum 18 comprising a three-dimensional image transfer device for effecting imaging and patterning of the now-entangled precursor construct. The image transfer device includes a moveable imaging surface which moves relative to a plurality of entangling manifolds 61, 62, 63 and 64, which act in cooperation with three-dimensional elements defined by the imaging surface of the image transfer device to effect imaging and patterning of the fabric being formed. The total energy applied to the fibrous batts of the imaging manifolds is adjusted to maintain the energy input in the range of about 0.027 to 0.046 hp-hr/lb. Other imaging techniques may be utilized in place of a three-dimensional image transfer device (ITD), including, but not limited to wire screens, perforated metal drums, and three-dimensionally surfaces belts, whereby the imaging technique is not meant to be a limiting factor of the present invention.

The present invention contemplates that the fibrous construct P' be advanced onto the moveable imaging surface of the image transfer device at a rate which is substantially equal to the rate of movement of the imaging surface. A J-box or scray can be employed for supporting the precursor layered construct P' as it is advanced onto the image transfer device to thereby minimize tension within the fibrous construct. By controlling the rate of advancement of the pre-entangled layered construct P and the construct P' through the process so as to minimize, or substantially eliminate, tension within the construct, differential hydroentanglement of the fibrous construct is desirably effected.

Figure 3:
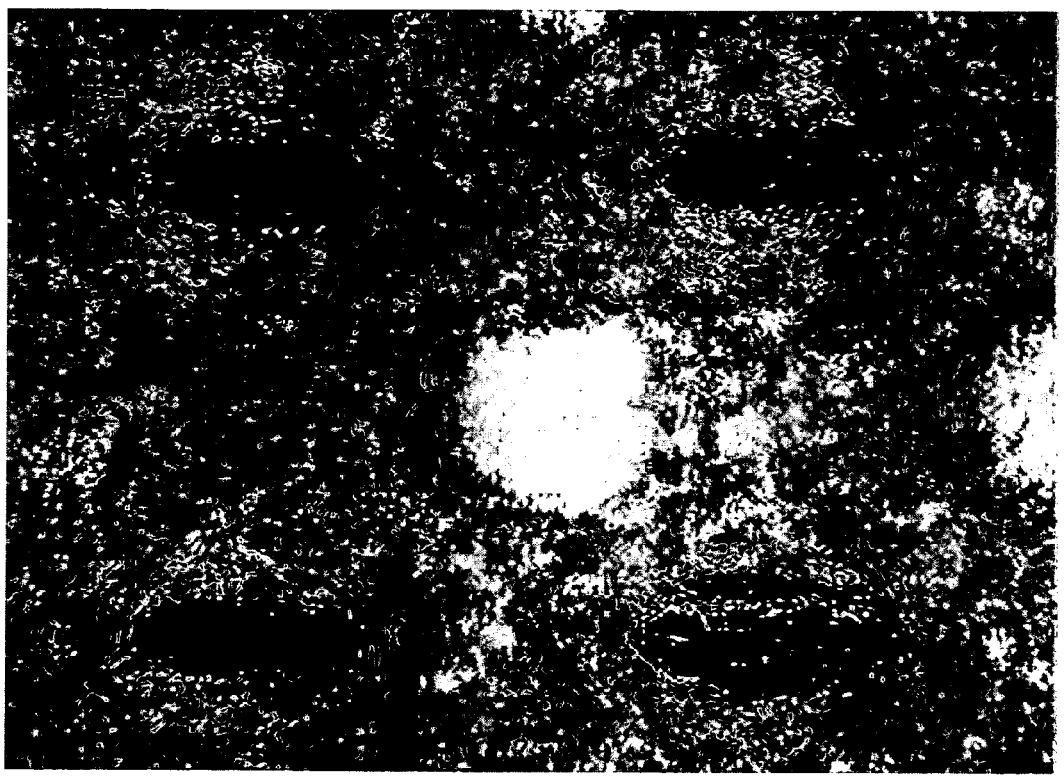
FIG. 3 is a view of a three-dimensionally imaged nonwoven fabric suitable for the present invention.

It has been contemplated that one or more imaged fibrous layers be utilized in one or more fibrous zones within the fabric, wherein the imparted three-dimensional raised elements, comprise char forming fiber either in whole or in part. A particularly suitable three-dimensionally imaged nonwoven fabric is one that comprises raised nubs as illustrated in FIG. 3.

It is also contemplated that one or more supplemental filamentary layers be added to the self-extinguishing fabric of the present invention, wherein such layers may include a spunbond or meltblown fabric. In general, the formation of continuous filament precursor webs involves the practice of the "spunbond" process. A spunbond process involves supplying a molten polymer, which is then extruded under pressure through a large number of orifices in a plate known as a spinneret or die. The resulting continuous filaments are quenched and drawn by any of a number of methods, such as slot draw systems, attenuator guns, or Godet rolls. The continuous filaments are collected as a loose web upon a moving foraminous surface, such as a wire mesh conveyor belt. When more than one spinneret is used in line for the purpose of forming a multi-layered fabric, the subsequent webs are collected upon the uppermost surface of the previously formed web. Further, the addition of a continuous filament fabric may include those fabrics formed from filaments having a nano-denier, as taught in U.S. Pat. Nos. 5,678,379 and 6,114,017, both incorporated herein by reference. Further still, the continuous filament fabric may be formed from an intermingling of conventional and nano-denier filaments.

The meltblown process is a related means to the spunbond process for forming a layer of a nonwoven fabric is the meltblown process. Again, a molten polymer is extruded under pressure through orifices in a spinneret or die. High velocity air impinges upon and entrains the filaments as they exit the die. The energy of this step is such that the formed filaments are greatly reduced in diameter and are fractured so that microfibers of finite length are produced. This differs from the spunbond process whereby the continuity of the filaments is preserved. The process to form either a single layer or a multiple-layer fabric is continuous, that is, the process steps are uninterrupted from extrusion of the filaments to form the first layer until the bonded web is wound into a roll. Methods for producing these types of fabrics are described in U.S. Pat. No. 4,041,203. The meltblown process, as well as the cross-sectional profile of the meltblown microfiber, is not a critical limitation to the practice of the present invention.

Subsequent to fabric formation, the self-extinguishing fabric may be subjected to one or more variety of post-entanglement treatments. Such treatments may include application of a polymeric binder composition(s), mechanical compacting, application or incorporation of performance enhancing additives, electrostatic compositions, and like processes.

The nonwoven fabric of the present invention is cost effective, soft, yet durable and suitable for various bedding articles including, but not limited to a mattress component, mattress covers, comforters, bedspreads, quilts, coverlets, duvets, pillows, pillow covers, in addition to other home uses, protective apparel applications, and industrial end-use applications.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A flame retardant, self extinguishing differentially entangled nonwoven fabric, comprising highly hydraulically entangled first and second outer fibrous zones and a lightly hydraulically entangled intermediate fibrous zone, wherein said first and second outer fibrous zones and said intermediate fibrous zone each comprises flame retardant fibers and char forming fibers, wherein said first and second outer fibrous zones are more highly entangled than said intermediate fibrous zone, whereby upon burning said intermediate fibrous zone provides a pocket of air between said first and second outer fibrous zone that provides the nonwoven fabric with resistance to heat flow and said nonwoven fabric being collapsible in on itself to self extinguish in association with charring of fibers in said intermediate fibrous zone.

2. A flame retardant, self extinguishing differentially entangled nonwoven fabric as in claim 1, wherein said first and second outer fibrous zones and said intermediate zone each comprises more than one fibrous layer.

3. A flame retardant, self extinguishing differentially entangled nonwoven fabric as in claim 2, wherein said fibrous zones comprise homogeneous fibrous layers, heterogeneous fibrous layers, or a combination thereof.

4. A flame retardant, self extinguishing differentially entangled nonwoven fabric as in claim 1, wherein said nonwoven fabric is formed by the application of hydraulic energy in the range of about 0.027 to 0.046 hp-hr/lb.

5. A flame retardant, self extinguishing differentially entangled nonwoven fabric as in claim 1, wherein said flame retardant fibers are selected from the group of aramids, polyimides, melamines, modacrylics, polyacrylonitriles, and a combination thereof.

6. A flame retardant, self extinguishing differentially entangled nonwoven fabric as in claim 1, wherein said char forming fibers are selected from the group consisting of cellulosics, acrylics, thermoplastics, and a combination thereof.

7. A flame retardant, self extinguishing differentially entangled nonwoven fabric as in claim 6, wherein said flame retardant fibers and said char forming fibers are staple length fibers.

8. A flame retardant, self extinguishing differentially entangled nonwoven fabric as in claim 7, wherein said staple length fibers have similar or dissimilar deniers.

9. A flame retardant, self extinguishing differentially entangled nonwoven fabric as in claim 7, wherein said staple length fibers have similar or dissimilar cross-section profiles.

10. A flame retardant, self extinguishing differentially entangled nonwoven fabric as in claim 1, wherein said nonwoven fabric comprises a three-dimensionally imaged fabric layer.

11. A flame retardant, self extinguishing differentially entangled nonwoven fabric as in claim 1, wherein said nonwoven fabric comprises a filamentary nonwoven fabric layer.

12. A flame retardant, self extinguishing differentially entangled nonwoven fabric as in claim 1, wherein said nonwoven fabric further comprises one or more physical performance enhancing chemistries.

13. A flame-retardant, self extinguishing differentially entangled nonwoven fabric as in claim 1, wherein said intermediate fibrous zone has a different loft than said first and second outer fibrous zones.

* * * * *